Feb. 23, 1971  B. GEORGE  3,565,478
TRIM MEMBER AND METHOD OF FORMING SAME
Filed May 6, 1968  5 Sheets-Sheet 1

INVENTOR.
BILLY GEORGE
BY Pearce & Schaeperklaus
Attorneys

INVENTOR.
BILLY GEORGE
BY Pearce and Schaeperklaus
Attorneys

Feb. 23, 1971     B. GEORGE     3,565,478

TRIM MEMBER AND METHOD OF FORMING SAME

Filed May 6, 1968     5 Sheets-Sheet 3

INVENTOR.
BILLY GEORGE
BY *Pearce and Schaeperklaus*
Attorneys

Feb. 23, 1971  B. GEORGE  3,565,478
TRIM MEMBER AND METHOD OF FORMING SAME
Filed May 6, 1968  5 Sheets-Sheet 4

INVENTOR.
BILLY GEORGE
BY Pearce and Schaepperklaus
Attorneys

Feb. 23, 1971                     B. GEORGE                       3,565,478
                    TRIM MEMBER AND METHOD OF FORMING SAME
Filed May 6, 1968                                                 5 Sheets-Sheet 5
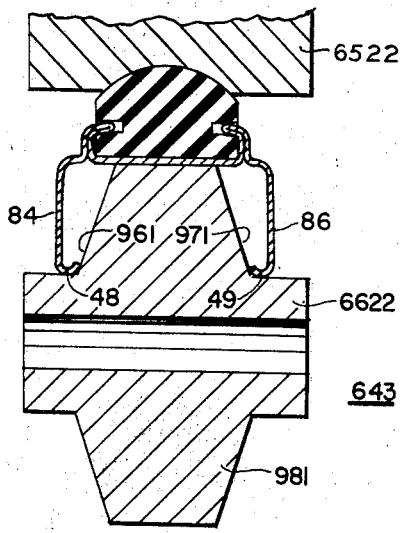
FIG. 22
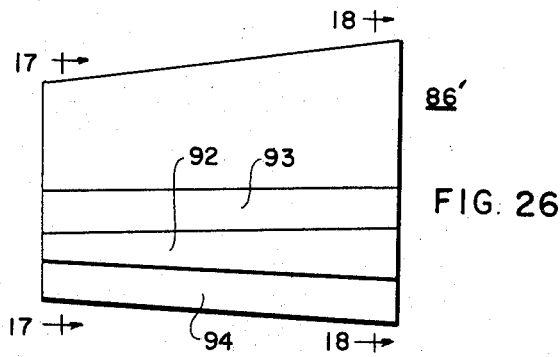
FIG. 26
FIG. 27
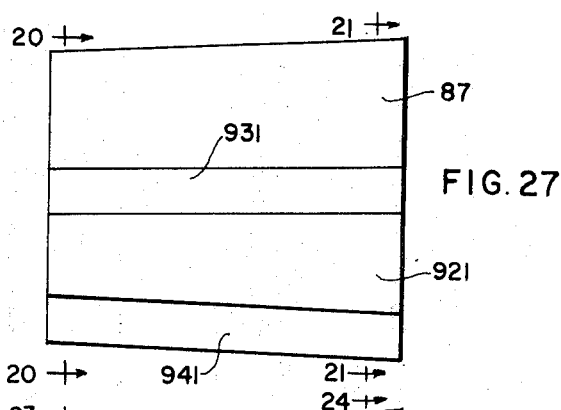
FIG. 28
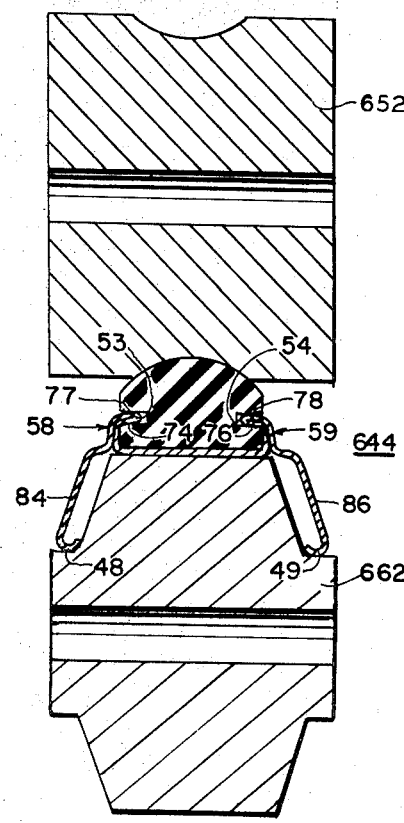
FIG. 25
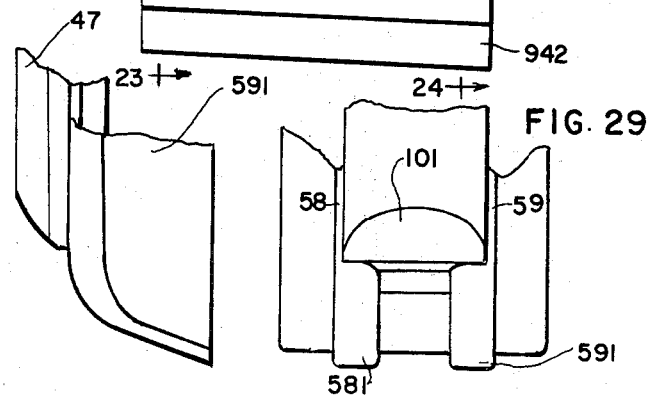
FIG. 30                FIG. 29
INVENTOR.
BILLY GEORGE
BY Pearce and Schaeperklaus
Attorneys United States Patent Office 3,565,478
Patented Feb. 23, 1971

3,565,478
TRIM MEMBER AND METHOD OF
FORMING SAME
Billy George, Cincinnati, Ohio, assignor to Textron, Inc.,
Providence, R.I., a corporation of Rhode Island
Filed May 6, 1968, Ser. No. 726,729
Int. Cl. B60r 13/04
U.S. Cl. 293—1          1 Claim

ABSTRACT OF THE DISCLOSURE

An elongated metal strip provided with spaced lengthwise doubled flanges therein and wing members extending outwardly of the doubled flanges, is assembled with a rubber-like resilient facing by swinging the wing members outwardly to cause the doubled flanges to swing inwardly into engagement with opposite faces of the facing to attach the facing to the body with a portion of the facing exposed.

---

This invention relates to decorative and protective trim for panels such as door panels and the like.

An object of this invention is to provide a decorative trim having a resilient exposed face and a rigid body.

A further object of this invention is to provide a method of forming such resilient-faced trim.

Briefly, this invention provides a trim member which includes an elongated body having a pair of spaced inwardly directed flanges. The flanges extend into lengthwise slots of an elongated resilient facing to hold the resilient facing and the body in assembled relation. The body is formed from a metal ribbon which is shaped to have spaced doubled flange portions extending outwardly therefrom spaced from edges thereof. Portions of the body between flanges and outer edges are swung to swing the flanges into the slots of the facing to cause assembly of the facing and body.

The above and other objects and features of the invention will be apparent to those of ordinary skill in the art to which this invention pertains from the following detailed description and the drawings, in which:

FIGS. 16 through 25 are fragmentary sectional views showing the formed ribbon and facing member in successive stages of assembly, forming rolls and wedge members being shown in association therewith, fragmentary portions of back-up rolls being shown in association therewith in FIGS. 16, 19 and 22 and a final back-up roll being shown in association therewith in FIG. 25;

FIG. 26 is a plan view of a first wedge forming member of the machine, section lines for the wedge portions shown in FIGS. 17 and 18 being indicated at 17—17 and 18—18, respectively;

FIG. 27 is a plan view of a second wedge forming member of the machine, section lines for the wedge portions shown in FIGS. 20 and 21 being indicated at 20—20 and 21—21, respectively;

FIG. 28 is a plan view of a third wedge forming member of the machine, section lines for the wedge portions shown in FIGS. 23 and 24 being indicated at 23—23 and 24—24, respectively;

FIG. 29 is a fragmentary plan view of an end portion of a length of trim; and

FIG. 30 is a view in side elevation of the end portion shown in FIG. 29.

In the following detailed description and the drawings, like reference characters indicate like parts.

Figure 2:
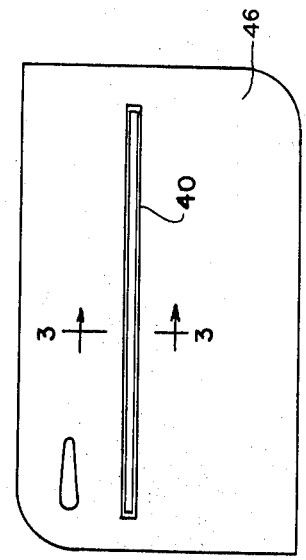
FIG. 2 is a view in side elevation of a door panel on which a length of trim is mounted.
Figure 1:
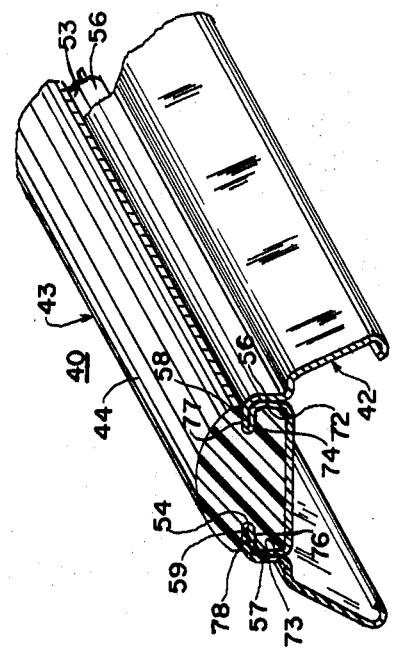
FIG. 1 is a perspective view of a portion of a length of trim constructed in accordance with an embodiment of this invention.
Figure 3:
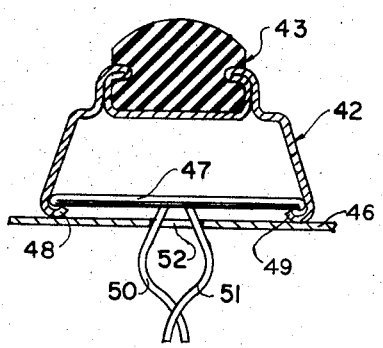
FIG. 3 is a view in section taken on the line 3—3 in FIG. 2.
Figure 5:
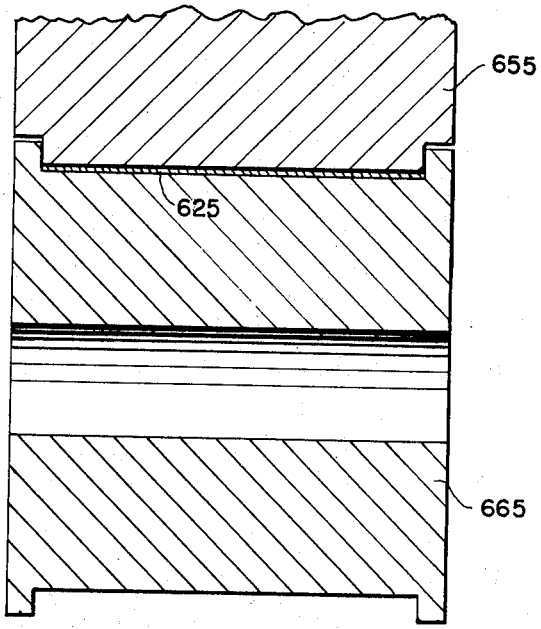
FIGS. 5 through 15 are fragmentary sectional views showing a metal ribbon in successive stages of formation, the ribbon being shown in association with fragmentary portions of successive pair of rollers of a ribbon forming section of the machine shown in FIG. 4.
Figure 6:
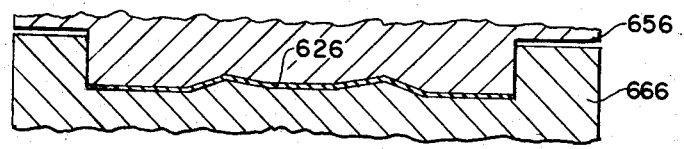
Figure 7:
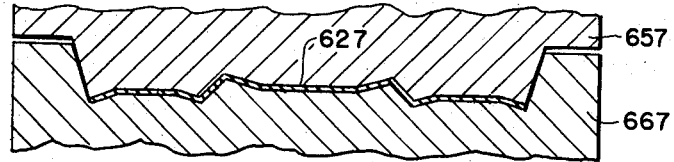
Figure 8:
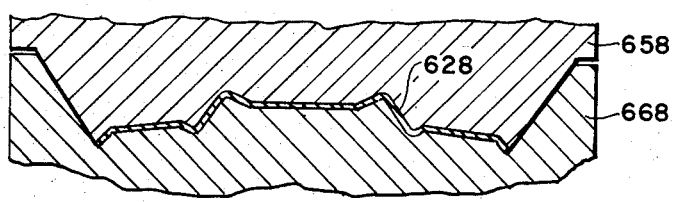
Figure 9:
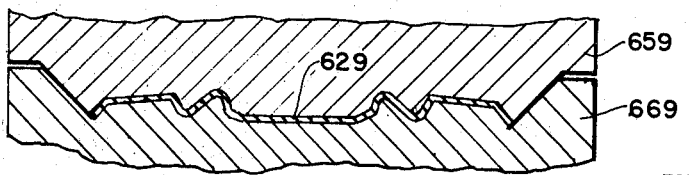
Figure 10:
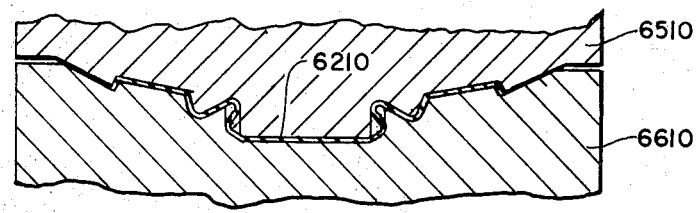
Figure 11:
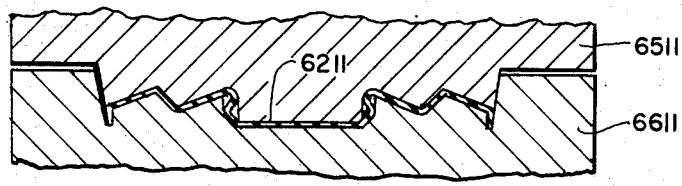
Figure 12:
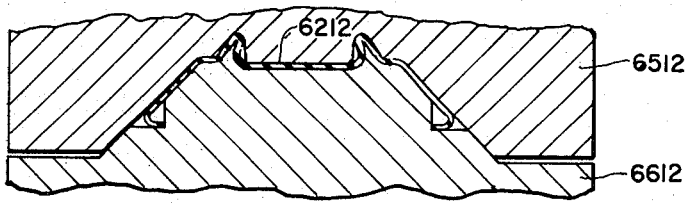
Figure 13:
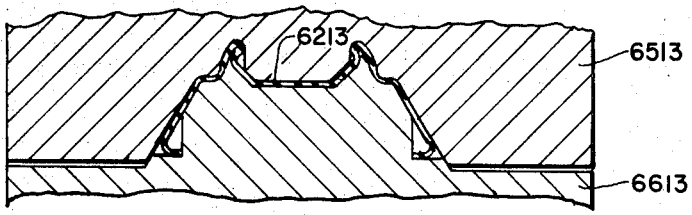
Figure 14:
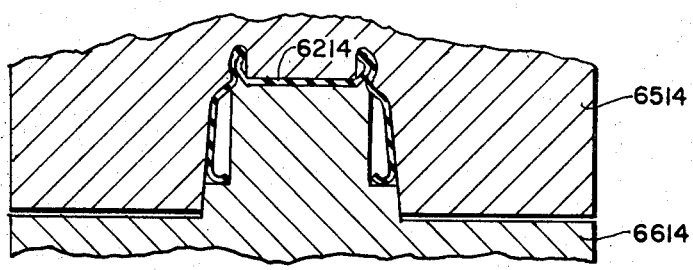
Figure 15:
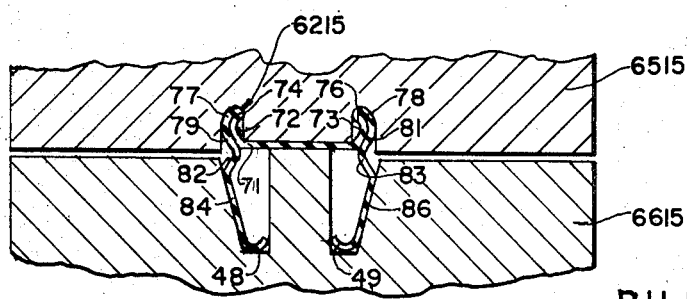

In FIG. 1 is shown a length of trim 40 which includes a sheet metal body 42 and a facing 43 of resilient rubber-like material. The facing has a rounded or domed outer face 44 which forms an impact receiving face when the trim 40 is mounted on a door panel 46 (FIG. 2) or the like. Appropriate spring clips 47, one of which is shown in FIG. 3, are seated inside terminal flanges 48 and 49 of the body. Prongs 50 and 51 of the clip 47 extend through an opening 52 in the panel 46 to mount the trim length on the panel 46.

As shown in FIG. 1, the facing 43 is provided with lengthwise slots 53 and 54 in side walls 56 and 57, respectively, thereof. The slots receive doubled flanges 58 and 59 of the body 42 to hold the facing 43 and the body 42 in assembled relation.

Figure 4:
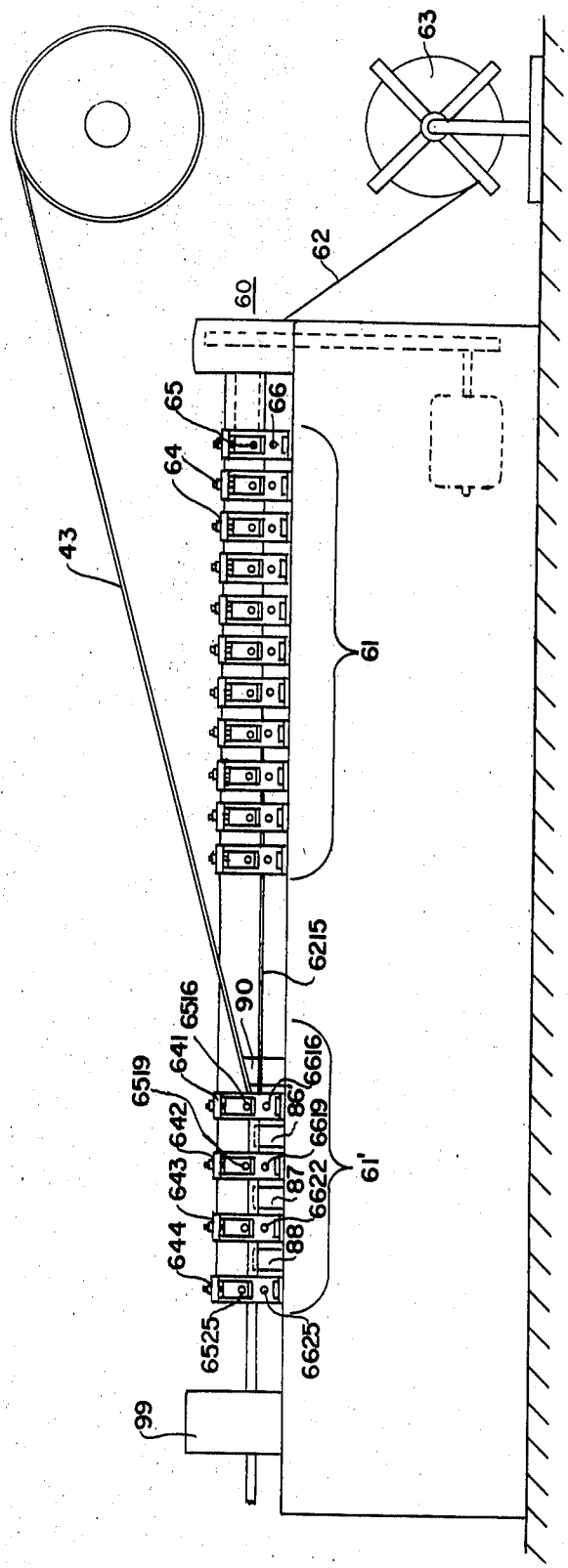
FIG. 4 is a somewhat schematic view in side elevation of a machine for forming the trim.

The trim is formed on a machine 60 (FIG. 4) which includes a body forming section 61 and an assembly section 61'. A metal ribbon 62 is fed to the machine 60 from a reel 63. The metal ribbon passes through roll stands 64 each of which supports upper and lower rolls 65 and 66. Fragmentary portions of successive pairs of rolls of the body forming section 61 are shown in FIGS. 5 to 15 inclusive, the upper roll of each pair being indicated by the numeral 65 followed by the figure designation, the lower roll of each pair being indicated by the numeral 66 followed by the figure designation, the formed ribbon at each stage being indicated by the numeral 62 followed by the figure designation. The series of rolls form the ribbon to the formed ribbon 6215 shown in FIG. 15, including a central section 71, outwardly directed inner flange sections 72 and 73, inwardly directed inner flange sections 74 and 76, outwardly directed outer flange sections 77 and 78, inwardly directed outer flange sections 79 and 81, outwardly directed linking flanges 82 and 83, wing flanges 84 and 86 and the terminal flanges 48 and 49.

Figure 16:
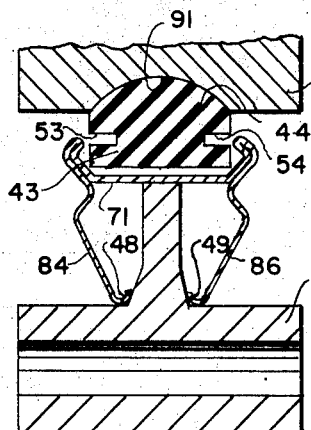

The formed ribbon 6215 and the facing 43 are assembled in the assembly section 61' (FIG. 1). The assembly section 61' includes roll stands 641, 642, 643 and 644 and wedge members 86', 87 and 88. At the roll stand 641, the facing 43 passes under an upper roll 6516 (FIG. 16) and the formed ribbon passes over a roll 6616. The roll 6616 includes a flange 89 which extends between the terminal flanges 48 and 49 and engages the central section 71 of the formed ribbon to guide the formed ribbon into the assembly section of the machine. A wedge block 90 (FIG. 1) guides the facing and the formed ribbon to the roll stand 641. The upper roll 6516 has a rounded circumferential groove 91 which receives the domed outer face 44 of the facing 43.

Figure 17:
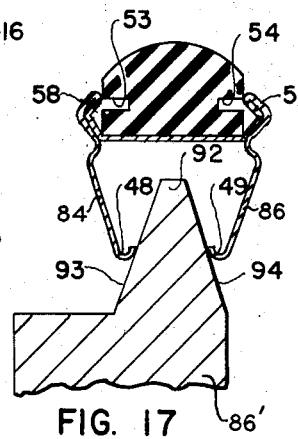
Figure 18:
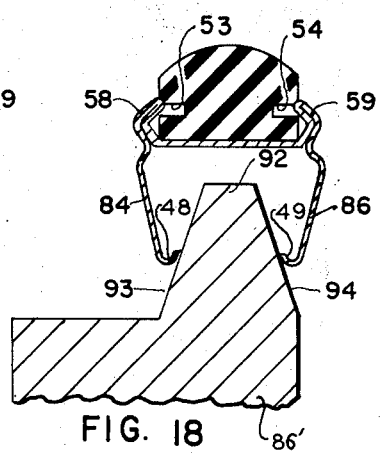

From the roll stand 641, the formed ribbon and the facing pass the wedge member 86'. As shown in FIGS. 17, 18 and 26, the wedge member 86' has an upstanding portion 92 having downwardly and outwardly sloping wedge walls 93 and 94 which diverge from the left hand end of the member 86 to the right hand end as shown in FIG. 26. The terminal flanges 48 and 49 engage the wedge walls 93 and 94 and are advanced outwardly from the FIG. 17 position to the FIG. 18 position together with the wing flanges 84 and 86 thereby causing the doubled flanges 58 and 59 to swing inwardly into the slots 53 and 54.

Figure 19:
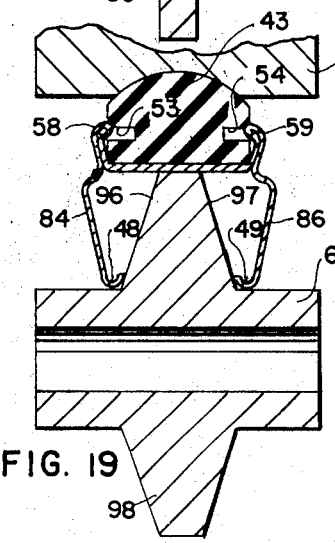
Figure 20:
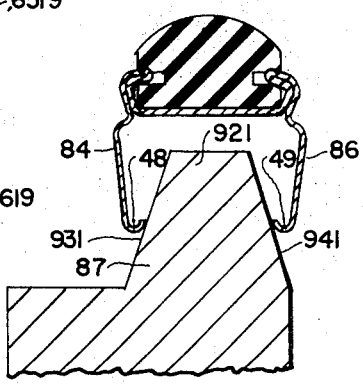
Figure 21:
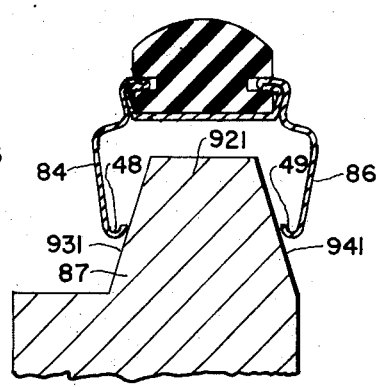
Figures 23, 24:
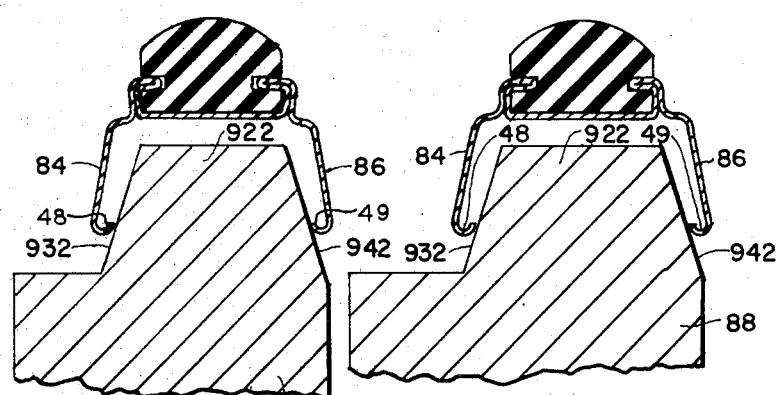

At the roll stand 642 (FIG. 19) the terminal flanges 48 and 49 engage sloping faces 96 and 97 of a flange 98 of a lower roll 6619 which causes further outward swinging of the terminal flanges 48 and 49 and of the wing flanges 84 and 86 to swing the doubled flanges 58 and 59 further into the lengthwise slots 53 and 54 of the facing 43. At the wedge members 87 (FIGS. 20, 21 and 27) and 88 (FIGS. 23, 24 and 28) and the roll stand 643 (FIG. 1), similar operations are carried out to swing the terminal flanges 48 and 49 and the wing flanges 84 and 86 further outward and to swing the doubled flanges 58 and 59 further inwardly until the sections 74 and 77 of the doubled flange 58 are seated in the slot 53 and sections 76 and 78 of the doubled flange 59 are seated in the slot 54, as shown in FIG. 25. Diverging wedge walls 931 and 941 of an upstanding portion 921 of the wedge member 87 (FIGS. 20, 21 and 27) and diverging walls 932 and 942 of an upstanding portion 922 of the wedge member 88 (FIGS. 23, 24 and 28) are engaged by the terminal flanges 48 and 49. Sloping faces 961 and 971 of a flange 981 of a lower roll 6622 (FIG. 22) engage the terminal flanges. Rolls 6525 and 6625 of the roll stand 644 are sizing rolls which determine the final form of the assembled trim. Lengths of the trim can be cut off as required by a trim cutter 99 (FIG. 1) not shown in detail.

As shown in FIG. 1, the doubled flanges 58 and 59 are of angle shape with doubled flange portions 74 and 77 being received in the lengthwise slot 53, doubled flange portions 76 and 78 being received in the lengthwise slot 54 and flange portions 72 and 73 engaging opposite side walls or faces 56 and 57 of the facing.

End portions of the metal ribbon portion of the length of trim can be drawn downwardly as shown in FIGS. 29 and 30 with the end of the facing 43 being cut away as indicated at 101 and end portions of the doubled flanges 58 and 59 being formed downwardly as indicated at 581 and 591 respectively to lock ends of the facing to the metal portion of the length of trim.

The trim member and the method of forming same described above and illustrated in the drawings are subject to modification without departing from the spirit and scope of the appended claim.

Having described my invention, what I claim as new and desire to secure by Letters Patent is:

1. An elongated trim member which comprises an elongated rubber-like facing and a strip metal body supporting the facing, there being lengthwise doubled flanges in the body engaging opposite faces of the facing to attach the facing to the body with a portion of the facing exposed, the body including wing members outboard of the doubled flanges, there being lengthwise slots in the opposite faces of the facing, one of the doubled flanges being received in each of the lengthwise slots, end portions of the body extending transversely of the body and end portions of the doubled flanges engaging end portions of the facing to lock the facing in position in the body.

References Cited

UNITED STATES PATENTS

| | | | |
|---|---|---|---|
| 3,290,082 | 12/1966 | Fritsch | 293—1 |
| 3,359,030 | 12/1967 | Newman | 293—1 |
| 3,388,523 | 6/1968 | Evans | 52—717 |

HAROLD ANSHER, Primary Examiner

W. E. HOAG, Assistant Examiner

U.S. Cl. X.R.

24—73; 49—490; 52—717; 161—102; 293—DIG. 4, 62